United States Patent [19]

Bryan

[11] Patent Number: 5,235,451

[45] Date of Patent: Aug. 10, 1993

[54] LIQUID CRYSTAL DISPLAY MODULE

[75] Inventor: Keith D. Bryan, Mississauga, Canada

[73] Assignee: Litton Systems Canada Limited, Etobicoke, Canada

[21] Appl. No.: 942,653

[22] Filed: Sep. 9, 1992

[51] Int. Cl.⁵ ............................................. G02F 1/133
[52] U.S. Cl. ...................................... 359/88; 359/54; 439/62
[58] Field of Search ............................ 359/54, 87, 88; 340/718, 716, 717; 439/59, 62, 66

[56] References Cited

U.S. PATENT DOCUMENTS 5,029,984 7/1991 Adachi et al. ........................ 359/54

Primary Examiner—William L. Sikes
Assistant Examiner—Huy K. Mai
Attorney, Agent, or Firm—Edmund W. Rusche

[57] ABSTRACT

This invention teaches a method of making reliable electrical contact between the driver IC circuits and the TFT matrix array by the use of wire bond connections which are short and which facilitate compact location of the drivers to the frame of a flat panel display or directly to the panel substrate.

9 Claims, 2 Drawing Sheets

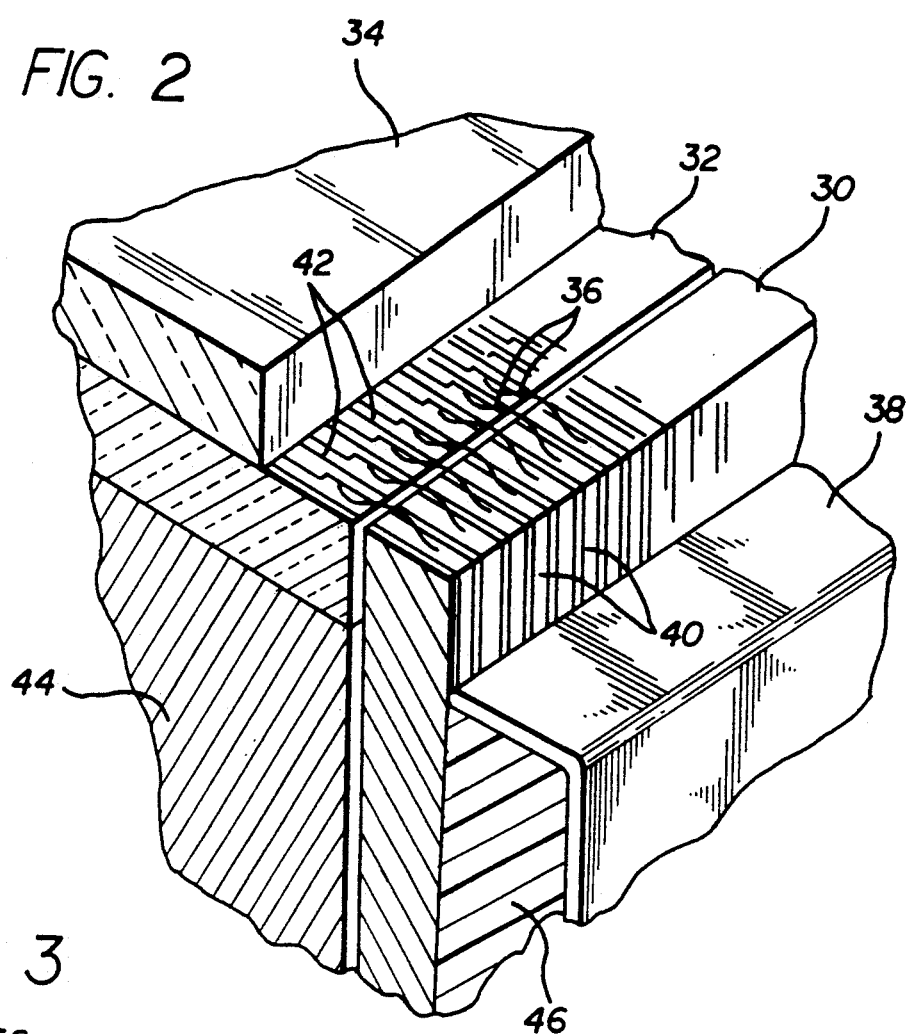
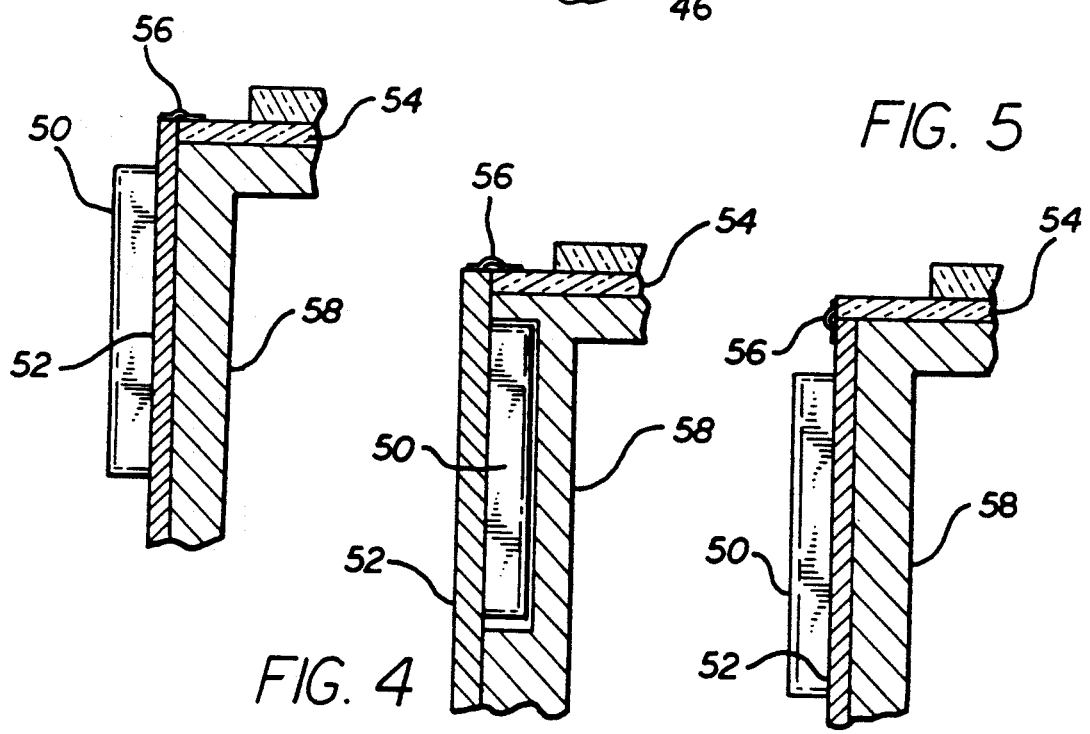

LIQUID CRYSTAL DISPLAY MODULE

BACKGROUND OF THE INVENTION

This invention relates to the construction of improved liquid crystal displays. The invention pertains to the manner in which the liquid crystal display (LCD) panel is electrically connected to the electronic driver assemblies which provide electrical control for the thin film transistor (TFT) matrix on the liquid crystal panel. More specifically this invention presents a compact, rugged approach to the assembly of the liquid crystal display module.

Generally, liquid crystal displays are an assembly comprising a glass panel unit (which is a thin film transistor matrix controlling a liquid crystal emulsion contained between transparent glass plate electrodes), driver electronics which provide the control signals to the TFT matrix, and a lighting unit placed beneath the glass panel unit for illuminating the LCD panel. The glass panel unit is comprised of a transparent glass substrate upon which the TFT matrix is placed (the LCD or panel substrate), a second conducting transparent glass plate placed a small distance from and parallel to the panel substrate, filled in-between with the liquid crystal material, and sealed around the edges. The entire assembly is housed by a frame, and usually has the driver assemblies attached to the frame near the front surface of the panel substrate which contains the TFT array.

The driver assemblies consist of a circuit board mounted on, or integral with, a "flex" print. The driver components are usually in the form of packaged chips either surfaced mounted or wire bonded to the circuit board. A heat sink is mounted on the reverse side of the "flex" behind the circuit board. The use of flex print circuits is generally subject to numerous electrical faults, but does give the benefit of providing flexibility of the electrical connections which can act to protect against vibration and other mechanical stresses which occur from the nature of this configuration.

The electrical output connection from the flex print to the TFT electrical contacts located on the front surface of the panel substrate is usually made with epoxy bonds. However, alternate interconnection can be made by wire bonding between the "flex" print and the panel substrate conductors. Both of these methods usually allow up to 80 connections per inch. The size of additional peripheral space required on existing LCD substrate panels beyond the active TFT area can be greater than one inch. This has the effect of making the LCD much larger than the viewable area.

The article "A Ten Inch Diagonal High Resolution Active Matrix Color LCD Module" by Kenichi Niki et al published in the 1988 Proceedings of the SID, pp. 259-263, shows the method of electrically connecting the driver integrated chip assemblies using flexible printed circuit straps. Their FIGS. 6 and 7 illustrate the technique that has generally been used in the prior art.

SUMMARY OF THE INVENTION

The invention presented herein teaches a method of making electrical contact between the driver IC circuits and the TFT matrix array by the use of wire bond connections which are short and which facilitate compact location of the drivers to the frame of a flat panel display or directly to the panel substrate.

Electrical conducting pads for the TFT array are deposited by any of a series of well-known methods to the surface of the panel substrate for the liquid crystal panel. These contact pads extend on the panel substrate out to or near the edge of the substrate. The peripheral space required on the panel substrate glass for these connection pads can be held to less than one inch beyond the active area of the TFT matrix.

By mounting the driver IC circuits on substrates with a well defined edge, usually 90° from the surface upon which the driver circuit chips are mounted, similar electrical contact pads may be deposited on the IC driver substrate and wrapped around from the flat IC driver surface onto its edge surface.

By positioning the driver substrates in approximate contact at the edges of the panel substrate the conducting pads located on the panel substrate are in close location with the conducting pads on the edge of the driver substrate. Connection between the pads is now effected utilizing the wire bond technique. The wire bond technique takes fine electrically conducting wires and makes attachment at one end of the wire to the panel substrate electrical pads and at the other end to the driver substrate electrical pads on its edge by creating fused connection at the two wire ends.

This method establishes a short, but firm, connection. These connections provides the opportunity for better reliability and operation over time in environments subject to vibration and other mechanical stresses. The amount of space utilized is reduced considerably by removing the bulky requirements necessary by prior art flex printed circuit cabling.

This technique provides the opportunity of using a modular approach in the LCD design which will give a more compact, more reliable, and more easily maintained assembly. The overall size of the glass panel (and thereby the added size beyond the viewing area) is dictated only by the space required to wire bond to conductors.

The pitch of these wire bonded conductors may range from 80 to 160 per inch under normal wire bond designs. These pitches and more dense pitches have been accomplished utilizing the invented wire bonded technique applied to the LCD.

BRIEF DESCRIPTION OF THE DRAWINGS

FIG. 2 shows a cut away view of the wire bonding technique.

FIG. 3 shows a cross-sectional view of one method for constructing the wire bond and maintaining the drivers in a compact design.

FIG. 4 shows a second embodiment similar in purpose to FIG. 3.

FIG. 5 shows an alternative embodiment with the wire bonding made over the edge of the flat panel display

DESCRIPTION OF THE PREFERRED EMBODIMENT

Figure 1:
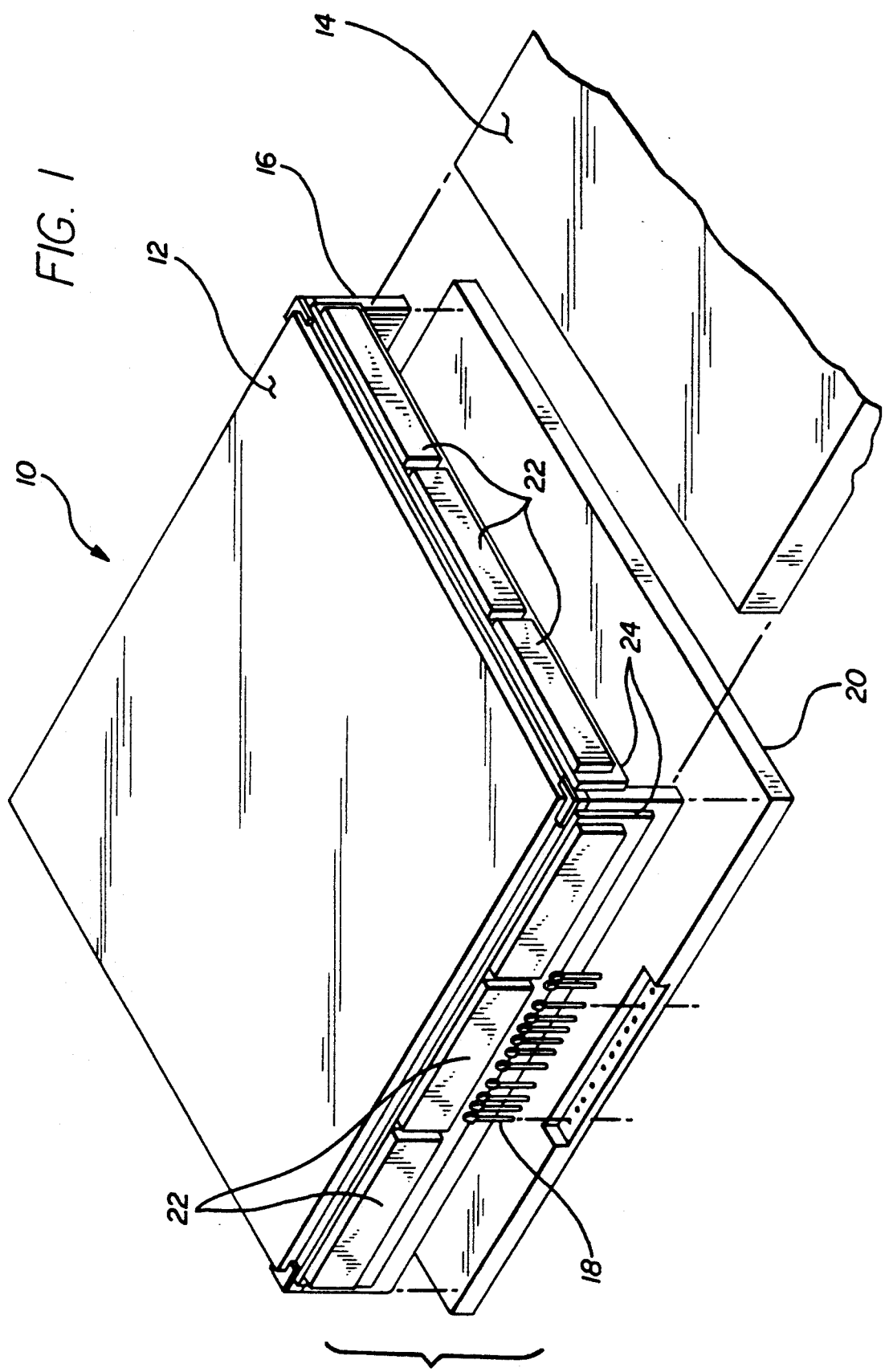
FIG. 1 shows the assembly of the LCD panel display frame and relevant components.

This invention presents an improved transistorized flat panel display unit which contains a TFT array mounted on a panel substrate connected to be driven with and through a dense multitude of electrical lead pads which are deposited on the surface and near the edges of the panel substrate. The electrical lead pads driving the TFT array are connected to electronic driver circuits that provide control signals to the TFT. The driver circuits are mounted on driver substrates which also contain electrically conducting lead pads connected with a first end to the driver circuit and a second end fixed upon the driver substrate surface and on the driver substrate edge. A plurality of individual connecting wires having their first ends fastened to select lead pads on said panel substrate by wire bonding techniques wherein said solid wires are fused to said lead pads, and their second ends fastened to select driver lead pads on said driver substrate, also by wire bonding techniques, wherein said solid wires are fused to said driver pads. The wire bonded connection then forms a firm electrical contact between the panel substrate and the driver substrates.

Standard techniques for wire bonding include ultrasonic bonding and ball formation melting bonding. In ball formation bonding a small ball of melt is formed at the end of the wire by melting the wire, usually with a hydrogen flame. An electric flame-off has been developed to melt the ball and form the bond between the wire and a surface electrical contact. This amounts to establishing an electrical voltage difference between an electrode to the bonding tool (the surface contact) and the wire to be bonded. Creation of a spark causes the formed ball to melt and fasten to the electrical conducting pad.

In contrast, the method of ultrasonic wire bonding does not require the development of heat in the process of creating a good conducting bond between the wire and the pad. During bonding the wire is pressed against the metal contact pad and ultrasonic energy is applied to the connection. As the wire is rubbed against the contact by the ultrasonic field, local heating is created and a metallurgical bond is well formed. Wires used in this process are usually aluminum although gold can be used.

FIG. 1 shows the LCD flat panel display unit 10. The unit is comprised of a liquid crystal glass panel display unit 12 mounted on a frame 16. Connected to the sides of the frame are driver circuits 22 which provide control power to the TFT array within glass panel unit 12. The drivers 22 are mounted on substrate boards 24 which are usually attached directly to frame 16, although they can be mounted directly to glass panel unit 12. Electrical connection to the drivers from external power and control sources occurs through the driver input pins 18. The above described assembly is mounted on a heat-sink board 20.

Inserted between heat sink board 20 and glass panel unit 12 is a back light assembly 14, shown here removed from its operating position for clarification. The back light assembly usually comprises fluorescent tubes to provide a source of light to be transmitted through the LCD glass panel unit 12. The heat generated by these lighting sources is absorbed and conducted from the assembly area by heat sink board 20.

Driver circuits 22 are usually integrated circuit boards containing the logic electronics required to drive the large array of transistors deposited in the TFT matrix. The electronic components and integrated circuits are mounted to substrate boards 24.

Referring to FIG. 2, LCD glass panel unit 12 is usually comprised of two glass panels; one, usually on the bottom and referred to as the panel substrate 32, constitutes a liquid crystal display panel substrate upon which the TFT matrix array is deposited. The second glass panel is the cover glass panel 34 located above panel substrate 32. This panel is also prepared as an electrode to establish a capacitive intereaction with the individual transistors in the TFT matrix on substrate 32. Between these two glass panels is a liquid crystal material which is subjected to electric fields set up between the transistors in the TFT and the cover glass 34 transparent electrode.

To carry control signals from drivers 46 to the large number of transistors in the TFT matrix it is necessary to deposit conducting electrodes 42 along all sides on TFT array panel substrate 32 to said transistors. These conducting paths can be very dense with as many as, or more than, 160 per inch being established in parallel fashion along the sides, and extending to the edge of panel substrate 32. At the edge of the panel substrate the electrical leads form a dense multitude of electrical lead pads awaiting connection to an external source of control signals.

The integrated circuits on drivers 46 (placed under protective lid covers 38) are electrically connected to similar conducting paths 40 on their respective driver substrates 30. These conducting paths are usually brought along the substrate and, in this invention, wrapped over one edge of driver substrate 30. Either on this edge or on the area leading up to the edge these electrical contacts form pads 40 awaiting electrical connections with the similar pads located on TFT array panel substrate 32.

In addition to the above construction, FIG. 2 further demonstrates connection through wire bonding of the two sets of pads together. Driver substrate 30 is mounted against the edge of panel substrate 32. Substrates 32 and 30 may be mounted and firmly attached to frame 44. Wire bonds 36 are shown making connection between electrical conducting pads 42 on panel substrate 32 and edge pads 40 located on driver substrate 30. Electrical contact is now completed between the driver circuitry and the TFT matrix array. This construction provides a firm vibration free and reliable means of making an electrical contact with the liquid crystal display module.

It is to be recognized that the wire bond connections can be made double or triple redundant by using more than one wire per connection if it is deemed appropriate for the purpose required in the use of the LCD display. This capability is a simple procedure within the present suggested configuration of this invention.

FIGS. 3, 4 and 5 show cut away views of preferred embodiments which make for compact connection of driver circuits to electrical lead connections for the TFT array on panel substrate 54. The figures show drivers 50 mounted on their respective substrates 52, and with panel substrate 54, all mounted against frame 58. Wires 56 are wire bonded in each figure to electrical conducting pads on driver substrate 52 and panel substrate 54.

The FIG. 3 embodiment shows drivers 50 located on the outside of substrate 52 away from frame 58. A more compact but, from a manufacturing point of view, more complex manner of construction is shown in FIG. 4 with drivers 50 positioned on the inside of its substrate 52 and inset in frame 58. In this embodiment electrical connection between the driver IC output and the electrical conducting pads must be through hole "let ins" placed in driver substrate 52.

FIG. 5 shows an embodiment, although presently difficult to implement in a manufacturing environment, with the wire bonding occurring from conducting pads on panel substrate 54 wrapped over its edge and driver pads located on the flat surface of driver substrate 52.

These methods of interconnection allow the drivers to be designed and mounted with minimum requirement for additional space beyond the viewing surface area needed for the LCD display module. The methods allow for the system to be constructed in a compact manner not interfering with accessibility to the back light assemblies and other components for purposes of facilitating maintenance to said unit. The techniques also provides the ability to drive every matrix line from both ends thereby further increasing reliability and enhancing quality of the display.

While this invention has been described with reference to its presently preferred embodiments its scope is not limited thereto. Rather such scope is only limited insofar as defined by the following set of claims and includes all equivalencies thereof.

What is claimed is:

1. A method for improving electrical connection between a transistorized flat panel display unit with a TFT panel substrate having a dense multitude of electrical lead pads deposited on a surface and extending to near the edges of said panel substrate and driver substrates having electrically conducting driver lead pads connected with electronic driving circuits that provide control signals to said flat panel display unit, which comprises the steps of:
    forming at least one edge on said driver substrates;
    depositing said electrically conducting driver lead pads on said driver substrate with a first end connected to receive control signals from said electronic driver circuits and a second end fixed upon said driver substrate surface and on said driver substrate edge;
    mounting said driver substrates in close proximity to said panel substrate positioned to have said edge adjacent to and coplanar with said surface of said panel substrate; and
    wire-bond fastening a plurality of individual connecting wires with their first ends fastened to select electrical lead pads on said panel substrate, whereby said wires are fused to said lead pads, and with their second ends fastened to select driver lead pads on said driver substrate, whereby said wires are fused to said driver lead pads, and whereby said wire bonded connections form a firm electrical contact between said panel substrate and said driver substrates.

2. An improved transistorized flat panel display unit with a TFT matrix on a panel substrate which is electrically driven through a dense multitude of electrical lead pads deposited on a surface and extending to near the edges of said panel substrate surface, said electrical lead pads being connected to electronic driver circuits that provide control signals to said flat panel display unit, which comprises:
    one or more driver substrates upon which are mounted said driver circuits, said driver substrates having at least one surface and at least one edge;
    electrically conducting driver lead pads connected with a first end to receive control signals from said driver circuits and a second end fixed upon said driver substrate edge;
    a plurality of individual connecting wires having their first ends fastened to preselected lead pads on said panel substrate by wire bonding technique whereby said solid wires are fused to said lead pads, and their second ends fastened to select driver leads on said driver substrate by wire bonding technique whereby said solid wires are fused to said driver lead pads, whereby said wire bonded connection forms a firm electrical contact between said panel substrate and said driver substrates.

3. An improved transistorized flat panel display according to claim 2 wherein said connecting wires are of a metal wire of a fine gauge.

4. An improved transistorized flat panel display unit with a TFT matrix on a panel substrate which is electrically driven through a dense multitude of electrical lead pads deposited on a surface and extending to near the edges of said panel substrate surface, said electrical lead pads being connected to electronic driver circuits that provide control signals to said flat panel display unit, which comprises:
    one or more driver substrates upon which are mounted said driver circuits, said driver substrates having at least one surface and at least one edge, and positioned to have said edge adjacent to and coplanar with said surface of said panel substrate;
    electrically conducting driver lead pads connected with a first end to receive control signals from said driver circuit and a second end fixed upon said driver substrate edge;
    a plurality of individual connecting wires having their first ends fastened to select lead pads on said panel substrate by wire bonding technique whereby said wires are fused to said lead pads, and their second ends fastened to select driver lead pads on said driver substrate by wire bonding technique whereby said wires are fused to said driver lead pads, whereby said wire bonded connection forms a firm electrical contact between said panel substrate and said driver substrates.

5. An improved transistorized flat panel display according to claim 4 wherein said connecting wires are of a metal wire of a fine gauge.

6. An improved transistorized panel display unit with a TFT matrix on a panel substrate which is electrically driven through a dense multitude of electrical lead pads deposited on a surface and extending to near the edges of said panel substrate surface, said electrical lead pads being connected to electronic driver circuits that provide control signals to said panel display unit, which comprises:
    one or more driver substrates upon which are mounted said driver circuits, said driver substrates having at least one surface and at least one edge;
    electrically conducting driver lead pads connected with a first end to receive control signals from said driver circuits and a second end fixed upon said driver substrate edge;
    a plurality of individual connecting wires having their first ends fastened to preselected lead pads on said panel substrate by wire bonding technique whereby said solid wires are fused to said lead pads, and their second ends fastened to select driver leads on said driver substrate by wire bonding technique whereby said solid wires are fused to said driver lead pads, whereby said wire bonded connection forms a firm electrical contact between said panel substrate and said driver substrates.

7. An improved transistorized panel display according to claim 6 wherein said connecting wires are of a metal wire of a fine gauge.

8. An improved transistorized flat panel display unit with a TFT matrix on a panel substrate which is electrically driven through a dense multitude of electrical lead pads, said electrical lead pads being connected to electronic driver circuits that provide control signals to said flat panel display unit, which comprises:

said panel substrate having at least one surface and at least one edge;

said dense multitude of electrical lead pads being deposited on said surface and said edge of said panel substrate surface one or more driver substrates upon which are mounted said driver circuits, said driver substrates having at least one surface and positioned to have said surface adjacent to said edge of said panel substrate;

electrically conducting driver lead pads connected with a first end to receive control signals from said driver circuits and a second end fixed upon said driver substrate surface and extending to near the edge;

a plurality of individual connecting wires having their first ends fastened to preselected lead pads on said panel substrate by wire bonding technique whereby said solid wires are fused to said lead pads, and their second ends fastened to select driver leads on said driver substrate by wire bonding technique whereby said solid wires are fused to said driver lead pads, whereby said wire bonded connection forms a firm electrical contact between said panel substrate and said driver substrates.

9. An improved transitioned panel display according to claim 8 wherein said connecting wires are of a metal wire of a fine gauge.

* * * * *